UNITED STATES PATENT OFFICE.

JAMES O. HANDY, OF PITTSBURGH, PENNSYLVANIA, ASSIGNOR TO PITTSBURGH TESTING LABORATORY, OF PITTSBURGH, PENNSYLVANIA, A CORPORATION OF PENNSYLVANIA.

METHOD OF MAKING PHENOL-FORMALDEHYDE CONDENSATION PRODUCTS.

1,287,299. Specification of Letters Patent. Patented Dec. 10, 1918.

No Drawing. Continuation of application Serial No. 200,710, filed November 7, 1917. This application filed March 19, 1918. Serial No. 223,309.

*To all whom it may concern:*

Be it known that I, JAMES O. HANDY, a citizen of the United States, residing at Pittsburgh, in the county of Allegheny and State of Pennsylvania, have invented a new and useful Improvement in the Methods of Making Phenol-Formaldehyde Condensation Products, of which the following is a full, clear, and exact description.

My invention has relation to a novel method of making phenol-formaldehyde condensation products, and is designed to provide an economical and efficient commercial method of making such products for use in various industries, and of particular value as a cement or binder for use in the brush-manufacturing industry.

It has heretofore been generally believed that products of this character produced without the use of a condensing agent were worthless, and although it has heretofore been proposed to make such products without the use of a condensing and catalytic agent, such proposals, in so far as I am aware, have been largely in the nature of impracticable suggestions to that effect. So far as I am aware, no practical commercial method has heretofore been disclosed by which this result could be accomplished.

I have, however, discovered that the use of condensing or catalytic agents may be entirely dispensed with in the commercial manufacture of these products. This is a decided advantage for a number of reasons. Condensing agents, even when used in the smallest amounts required for inducing a reaction, cause rapid heating, frothing, etc., rendering the reaction difficult to control and necessitating the use of very efficient cooling devices for preventing loss of material, or rendering the apparatus employed useless because of solidification of the material therein or because of the production therein of difficultly soluble matter.

Furthermore, it is not possible to make an anhydrous viscous liquid condensation product when a condensing agent is used, since separation by gravity will always leave some water in the viscous liquid product and boiling off water causes undesirable thickening or solidification.

My method yields an anhydrous liquid product capable of binding bristles in brush manufacture and of otherwise serving as a bond or cement or a coating or impregnating material in the electric and other industries.

I have found that the following appear to be essential features in the making of useful products from phenols and formaldehydes without condensing agents, viz:

1. The use of commercial cresylic acid preferably of 97 to 99 per cent. strength and having a specific gravity approximating 1.03 at 20° C., although an inferior reaction may be obtained with less pure cresylic acid.

2. The use of commercial 40 per cent. formaldehyde in ratios exceeding the one to one molecular ratio of formaldehyde to cresylic acid.

3. The boiling of the mixture until the solids in the final condensation product, determined at 110° C., exceed 40 per cent. by weight and are infusible, hard and tough, and also insoluble in acetone.

The initial boiling should be done without loss of material and the final boiling should be carried out in a manner to cause distillation of water and some of the formaldehyde. The final temperature may vary, but should not be less than 110° C. or more than 120° C., if a satisfactory liquid product is to be obtained.

My preferred formula is as follows:

Cresylic acid—97 to 99% strength—2 gallons.

Formaldehyde—40%—2$\frac{6}{10}$ gallons.

Smaller amounts of formaldehyde even to as low as 1$\frac{1}{3}$ gallons may, however, be used.

These materials are placed in a metal vessel with reflux condenser attached, and are boiled together without pressure, usually for about two hours. Water and excess formaldehyde are then distilled off and the temperature raised until about 120° C. is reached. The liquid is then quickly cooled and is ready for use. As above stated, the boiling should take place until the solid resin obtained by the evaporation of the viscous liquid, which separates from the watery reaction product, amounts to 40 per cent. or more by weight and is infusible, hard and tough and also insoluble in acetone. This determination is made at a temperature of 110° C, after all boiling is completed. The time required will depend somewhat upon the composition of the cresylic acid and also upon the kind of apparatus employed. The entire operation is under a degree of control which cannot be exercised when catalytic or condensing agents are employed. The method can be and preferably is carried out without the use of pressure at any stage of the manufacture or use.

The liquid product obtained is anhydrous. It is a much more stable product than those made by the use of catalytic agents. It has a specific gravity of approximately 1.11 at 20° C., and yields on drying at 110° C. from 40 to 50 per cent. of hard insoluble solid matter. Compositions in which this liquid is used as a binder may be made with a tensile strength exceeding 1400 lbs. per square inch. It is especially valuable for use in the brush-manufacturing industry, but has many other uses either alone or mixed with solvents.

My invention is also applicable to the production of a solid or semi-solid product, either by relatively slow cooling after the final temperature is reached, or by heating to a higher temperature, or both, according to the nature of the product desired. For example, after distilling off the water and excess formaldehyde, with a final temperature of 120° C., a slow cooling will give a product which, although clear and substantially colorless, will not flow at ordinary temperatures. By carrying the final temperature to 140° C., I have produced a product in the form of a brittle resin which would soften slightly at 110° C.; and by carrying the final temperature to 160° C., the resinous product did not noticeably soften at 110° C. These temperatures are illustrative only. The rate of cooling of the product may be regulated in any well known manner. For instance, if the cooling is carried out in a water-jacketed vessel, the circulation of cooling water in the jacket may be retarded or entirely stopped and the heated material allowed to stand surrounded by water which will cool slowly to room temperature as the mass of material gives up its heat slowly by conduction.

The present application is a continuation of my application Serial No. 200,710, filed November 7, 1917.

I claim:

1. The method of making, without the use of a condensing agent, a phenol-formaldehyde condensation product in the form of an anhydrous liquid which consists in boiling a mixture composed of commercial cresylic acid or from 97 to 99 per cent. strength and commercial 40 per cent. formaldehyde, until the solids in the condensation product, determined at 110° C., equal or exceed 40 per cent. by weight, the final boiling during which water and excess formaldehyde are distilled off being at a temperature above 100° C.

2. The method of making, without the use of a condensing agent, a phenol-formaldehyde condensation product in the form of an anhydrous viscous liquid, which consists in boiling a mixture composed of commercial cresylic acid of from 97 to 99 per cent. strength and commercial 40 per cent. formaldehyde, until the solids in the condensation product, determined at 110° C., equal or exceed 40 per cent. by weight, the final boiling during which water and excess formaldehyde are distilled off being at a temperature of from 110° to 120° C.

3. The herein described method of making, without the use of a condensing agent, a phenol-formaldehyde condensation product, which consists in boiling a mixture composed of commercial cresylic acid of from 97 to 99 per cent. strength and commercial 40 per cent. formaldehyde, the two being mixed in ratios exceeding the one to one molecular ratio of formaldehyde to cresylic acid, boiling the mixture until the solids in the condensation product, determined at 110° C., equal or exceed 40 per cent. by weight and are infusible, hard and tough, and also insoluble in acetone, the final boiling during which water and excess formaldehyde are distilled off being at a temperature not less than 110° C. or more than 120° C.

4. The herein described method of forming, without the use of a condensing agent, a phenol-formaldehyde condensation product in the form of an anhydrous viscous liquid, which consists in boiling a mixture of cresylic acid and formaldehyde mixed in ratios exceeding the one to one molecular ratio of formaldehyde to cresylic acid until the solids in the condensation product, determined at 110° C., equal or exceed 40 per cent. by weight, the final boiling during which water and excess formaldehyde are distilled off being at a temperature of not less than 110° C. and not more than 120° C.

5. The herein described method of making a phenol-condensation product without the use of a condensing agent, which consists in boiling a mixture composed of commercial cresylic acid and formaldehyde mixed in ratios exceeding the one to one molecular ratio of formaldehyde to cresylic acid, and boiling the mixture until the solids in the condensation product equal or exceed 40 per cent. by weight, determined at 110° C., the final boiling during which water and excess formaldehyde are distilled off being at a temperature in excess of 100° C.

6. The herein described method of making a phenol-condensation product without the use of a condensing agent, which consists in boiling a mixture composed of commercial cresylic acid and formaldehyde mixed in ratios exceeding the one to one molecular ratio of formaldehyde to cresylic acid, and boiling the mixture until the solids in the condensation product equal or exceed 40 per cent. by weight, determined at 110° C., the final boiling during which water and excess formaldehyde are distilled off being at a temperature in excess of 100° C., and controlling the temperature conditions to control the softening point of the product, increasing the final boiling temperature and retarding the rate of cooling, each acting to raise the softening point of the product.

7. The herein described method of making a phenol-condensation product without the use of a condensing agent, which consists in boiling a mixture composed of commercial cresylic acid and formaldehyde mixed in ratios exceeding the one to one molecular ratio of formaldehyde to cresylic acid, and boiling the mixture until the solids in the condensation product equal or exceed 40 per cent. by weight, determined at 110° C., and controlling the degree of solidity of the product and its resistance to heat by controlling the temperature at which water and excess formaldehyde are distilled off, the softening point of the product being raised by raising such final boiling temperature.

In testimony whereof, I have hereunto set my hand.

JAS. O. HANDY.